(12) United States Patent
Blunier et al.

(10) Patent No.: US 10,368,474 B2
(45) Date of Patent: Aug. 6, 2019

(54) DOUBLE ROLLING BASKET LINKAGE

(71) Applicant: CNH Industrial America LLC, New Holland, PA (US)

(72) Inventors: Timothy R. Blunier, Danvers, IL (US); Gaylen J. Kromminga, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 57 days.

(21) Appl. No.: 15/414,891

(22) Filed: Jan. 25, 2017

(65) Prior Publication Data

US 2018/0206388 A1 Jul. 26, 2018

(51) Int. Cl.
*A01B 63/32* (2006.01)
*A01B 29/04* (2006.01)
*A01B 49/02* (2006.01)

(52) U.S. Cl.
CPC ............ *A01B 63/32* (2013.01); *A01B 29/048* (2013.01); *A01B 49/027* (2013.01)

(58) Field of Classification Search
CPC ......... A01B 63/32; A01B 63/24; A01B 29/04; A01B 49/027
See application file for complete search history.

(56) References Cited

U.S. PATENT DOCUMENTS

| | | | |
|---|---|---|---|
| 3,139,943 A * | 7/1964 | Evans | A01B 3/46 172/396 |
| 3,220,488 A * | 11/1965 | Becker | A01B 29/048 172/307 |
| 3,578,089 A * | 5/1971 | Fischer | A01B 59/048 172/484 |
| 3,738,432 A * | 6/1973 | Kelley | E02F 5/32 172/248 |
| 3,770,065 A * | 11/1973 | Gill | E02F 3/8157 172/4.5 |

(Continued)

FOREIGN PATENT DOCUMENTS

| | | |
|---|---|---|
| DE | 20 2015 106 946 U1 | 3/2016 |
| GB | 2533945 A | 7/2016 |
| WO | 2006/056767 A1 | 6/2006 |

OTHER PUBLICATIONS

"Rolling Harrow 1645", Unverferth Seedbed Tillage, Unverferth Manufacturing Co, Inc., retrieved from: https://www.umequip.com/tillage/seedbed/rolling-harrow/1645/ on Apr. 20, 2017 (3 pages).

(Continued)

*Primary Examiner* — Jamie L McGowan
(74) *Attorney, Agent, or Firm* — Rebecca L. Henkel; Rickard K. DeMille

(57) ABSTRACT

An agricultural tillage implement includes a frame member, a secondary frame member and at least one double rolling basket assembly coupled to the secondary frame member. A plurality of linkage assemblies interconnect the frame member and the secondary frame member. Each linkage assembly includes an upper link connected to upper connections of the frame member and the secondary frame member and a lower link connected to lower connections of the frame member and the secondary frame member. A force applicator operates against one of the links to move the baskets up and down.

12 Claims, 3 Drawing Sheets

(56) References Cited

U.S. PATENT DOCUMENTS

| | | | | |
|---|---|---|---|---|
| 4,091,878 A * | 5/1978 | Steketee | ............. | A01B 49/027 |
| | | | | 172/147 |
| 4,119,156 A * | 10/1978 | Wheeler | ................. | A01B 3/46 |
| | | | | 172/386 |
| 4,359,101 A * | 11/1982 | Gagnon | ................ | A01B 9/006 |
| | | | | 172/38 |
| 4,446,925 A * | 5/1984 | Vachon | ................. | A01B 63/22 |
| | | | | 172/142 |
| 4,479,549 A * | 10/1984 | Fegley | ................ | A01B 73/044 |
| | | | | 172/142 |
| 4,489,789 A * | 12/1984 | Pearce | .................. | A01B 51/04 |
| | | | | 172/443 |
| 4,561,504 A * | 12/1985 | Andersen | ............ | A01B 23/046 |
| | | | | 172/142 |
| 5,052,495 A * | 10/1991 | McFarlane | ............ | A01B 49/02 |
| | | | | 172/140 |
| 5,228,522 A * | 7/1993 | Stufflebeam | ........... | A01B 63/11 |
| | | | | 172/413 |
| 5,479,992 A * | 1/1996 | Bassett | ................ | A01B 63/114 |
| | | | | 111/134 |
| 6,647,904 B1 * | 11/2003 | Mariman | ............... | A01B 63/26 |
| | | | | 111/62 |
| 7,065,945 B2 | 6/2006 | Hurtis | | |
| 7,866,410 B2 * | 1/2011 | Ryder | ................... | A01C 7/203 |
| | | | | 111/135 |
| 8,020,629 B1 | 9/2011 | McFarlane et al. | | |
| 8,074,728 B2 | 12/2011 | Kovach et al. | | |
| 8,695,721 B2 | 4/2014 | Phely et al. | | |
| 8,887,824 B1 | 11/2014 | Johnson et al. | | |
| 9,326,439 B2 | 5/2016 | Westlind | | |
| 9,439,339 B2 * | 9/2016 | Hurd | ...................... | A01B 37/00 |
| 9,521,798 B2 | 12/2016 | Kovach et al. | | |
| 2003/0196823 A1 * | 10/2003 | McDonald | ............. | A01B 25/00 |
| | | | | 172/146 |
| 2004/0016554 A1 * | 1/2004 | McDonald | ............. | A01B 25/00 |
| | | | | 172/146 |
| 2012/0298386 A1 * | 11/2012 | Steffan | ................... | A01B 19/02 |
| | | | | 172/138 |
| 2013/0037286 A1 * | 2/2013 | Knobloch | ............. | A01C 5/062 |
| | | | | 172/640 |
| 2014/0054051 A1 | 2/2014 | Landoll et al. | | |
| 2014/0209335 A1 * | 7/2014 | Casper | ..................... | A01B 5/04 |
| | | | | 172/260.5 |
| 2014/0251646 A1 * | 9/2014 | Gray | ................... | A01B 61/044 |
| | | | | 172/1 |
| 2014/0262379 A1 * | 9/2014 | Landoll | ................. | A01B 33/02 |
| | | | | 172/452 |
| 2015/0053437 A1 * | 2/2015 | Kovach | ............... | A01B 29/048 |
| | | | | 172/149 |
| 2015/0156962 A1 * | 6/2015 | Zemenchik | ......... | A01B 79/005 |
| | | | | 172/1 |
| 2017/0049037 A1 * | 2/2017 | Hilvers | ............... | A01B 49/027 |
| 2018/0042164 A1 * | 2/2018 | Blunier | ................. | A01B 29/06 |

OTHER PUBLICATIONS

"Besler Stalk Chopper", Besler Industries, Inc., retrieved from: http://www.beslerindustries.com/product/double-basket-assembly on Apr. 20, 2017 (4 pages).

"2984 Strip Freshener", Yetter Profitable Solutions, retrieved from: http://www.yetterco.com/products?catId=139&productId=259 on Apr. 20, 2017 (2 pages).

"Track TILLr", Orthman Manufacturing, Inc., http://www.orthman.com/our-products.aspx?temid=2051&prodid=10886&pagetitle=Track+TILLr on Apr. 20, 2017 (12 pages).

* cited by examiner

DOUBLE ROLLING BASKET LINKAGE

BACKGROUND OF THE INVENTION

1. Field of the Invention

The present invention relates to agricultural implements, more particularly to agricultural tillage implements having rolling basket attachments and still more particularly to positioning linkages connecting double rolling basket attachments to agricultural tillage implements.

2. Description of the Related Art

Farmers utilize a wide variety of tillage implements to prepare soil for planting. Tillage equipment prepares the soil by way of mechanical agitation of various types, such as digging, stirring, and overturning. Some examples include plowing (overturning with moldboards or chiseling with chisel shanks), rototilling, rolling with cultipackers or other rollers, harrowing, and cultivating with cultivator shanks. Tillage is often classified into two types, primary and secondary. There is no strict definition of the two tillage types; however, a loose distinction between the two types of tillage is that primary tillage is deeper and more thorough while secondary is shallower. Primary tillage, such as plowing, tends to produce a rough surface finish and significantly subsoil effects, whereas secondary tillage tends to produce a smoother surface finish, such as that required to make a good seedbed for many crops. Harrowing and rototilling often combine primary and secondary tillage into one operation.

Some tillage implements include two or more sections coupled together to perform multiple functions as the implements are pulled through fields by tractors. A field cultivator is capable simultaneously of tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting a crop. Grass or residual crop material disposed on top of the soil during harvesting is also worked into the seedbed so that the residual material does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling basket, etc., or any combination thereof. The rolling basket has a reel with a plurality of spaced blades, positioned either axial or helical from end-to-end, for breaking clods into smaller sizes and chopping up the debris still remaining on the top of the soil.

The rolling basket arrangement can be used to roll behind the rows of tines of a harrow, to flatten the ridges left by the tines and move the residual crop material into the soil to enhance contact with the soil. The rolling basket is used to provide a firm, level field with coarse soil on top that resists crusting, with the finer soil particles at planting depth for optimum seed-to-soil contact.

One of the primary uses for rolling baskets is to break down clod sizes and firm up seed beds for subsequent planting. However, in some field conditions, a single pass with a rolling basket is insufficient for optimum clod size reduction and seed bed preparation. Making multiple passes with an independent basket implement may provide better results, but such an operation is inefficient and expensive. A set of double baskets operating behind an implement provides twice the contact points on the soil compared to a single basket. Accordingly, a double basket generally leaves a seedbed finish with smaller clods. However, because of the multiple contact points with the ground, a double basket can be more difficult to adjust and set correctly. Some known double baskets arrangements are rigid, making the baskets difficult to adjust throughout the working range of adjustment. A double basket that is set at a fixed angle relative to the ground for a specified depth will not be oriented correctly to the ground when operated at other positions within the working range of the implement.

What is needed in the art is a multiple rolling basket attachment for tillage equipment wherein the baskets retain proper orientation throughout the effective adjustable range for operation.

SUMMARY OF THE INVENTION

The present invention provides a tillage implement with a double rolling basket assembly having fore and aft baskets connected one to another by hanger assemblies and to the machine by a double link linkage mechanism.

The double rolling basket linkage, in one form, is directed to an agricultural tillage implement, having a frame member; a secondary frame member, an upper link pivotally connecting the frame member to the secondary frame member at upper positions of the frame member and secondary frame member and a lower link pivotally connecting the frame member and the secondary frame member at lower positions of the frame member and the secondary frame member. A force applicator connects to one of the links. A side hanger is coupled to the secondary frame member. The side hanger includes first and second legs extending downwardly and outwardly relative to the second frame member. A first rolling basket is connected to the first leg, and a second rolling basket is connected to the second leg.

The double rolling basket linkage, in another form, is directed to an attachment for an agricultural tillage implement having a frame. The double rolling basket attachment is provided with a forward basket, a rearward basket directly behind the forward basket and a hanger having a forward leg forming a rotational coupling with the forward basket and a rearward leg forming a rotational coupling with the rearward basket. A secondary frame member is coupled with the hanger. A plurality of linkage assemblies interconnects the secondary frame member with the frame member. Each linkage assembly has an upper link and a lower link connecting the secondary frame member to the frame member. A force applicator is connected to one of the upper and lower links The double rolling basket linkage, in yet another form, is directed to an agricultural tillage implement having a frame member. A secondary frame member is movably coupled with the frame member. A double rolling basket assembly is coupled with the secondary frame member. The double rolling basket assembly includes a first rolling basket, a second rolling basket behind the first rolling basket and first and second hangers at opposite ends of the first and second rolling basket. Each of the hangers connects the first and second rolling baskets to the secondary frame member. A plurality of linkage assemblies connects the secondary frame member to the frame member. Each linkage assembly of the plurality of linkage assemblies has an upper link and a lower link extending between the frame member and the secondary frame member, and a force applicator operating against one of the upper and lower links.

An advantage of the double rolling basket attachment disclosed herein is that rolling baskets are provided in a fore and aft arrangement that promotes more effective clod size reduction and surface preparation than is provided by a single rolling basket, and the baskets maintain proper orientation to the ground throughout the adjustable range of the baskets.

Another advantage of the double rolling basket attachment disclosed herein is that the double rolling basket attachment is suitable for use with existing implements as an added attachment thereto.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate some embodiments of the invention and such exemplifications are not to be construed as limiting the scope of the invention in any manner.

DETAILED DESCRIPTION OF THE INVENTION

Figure 1:
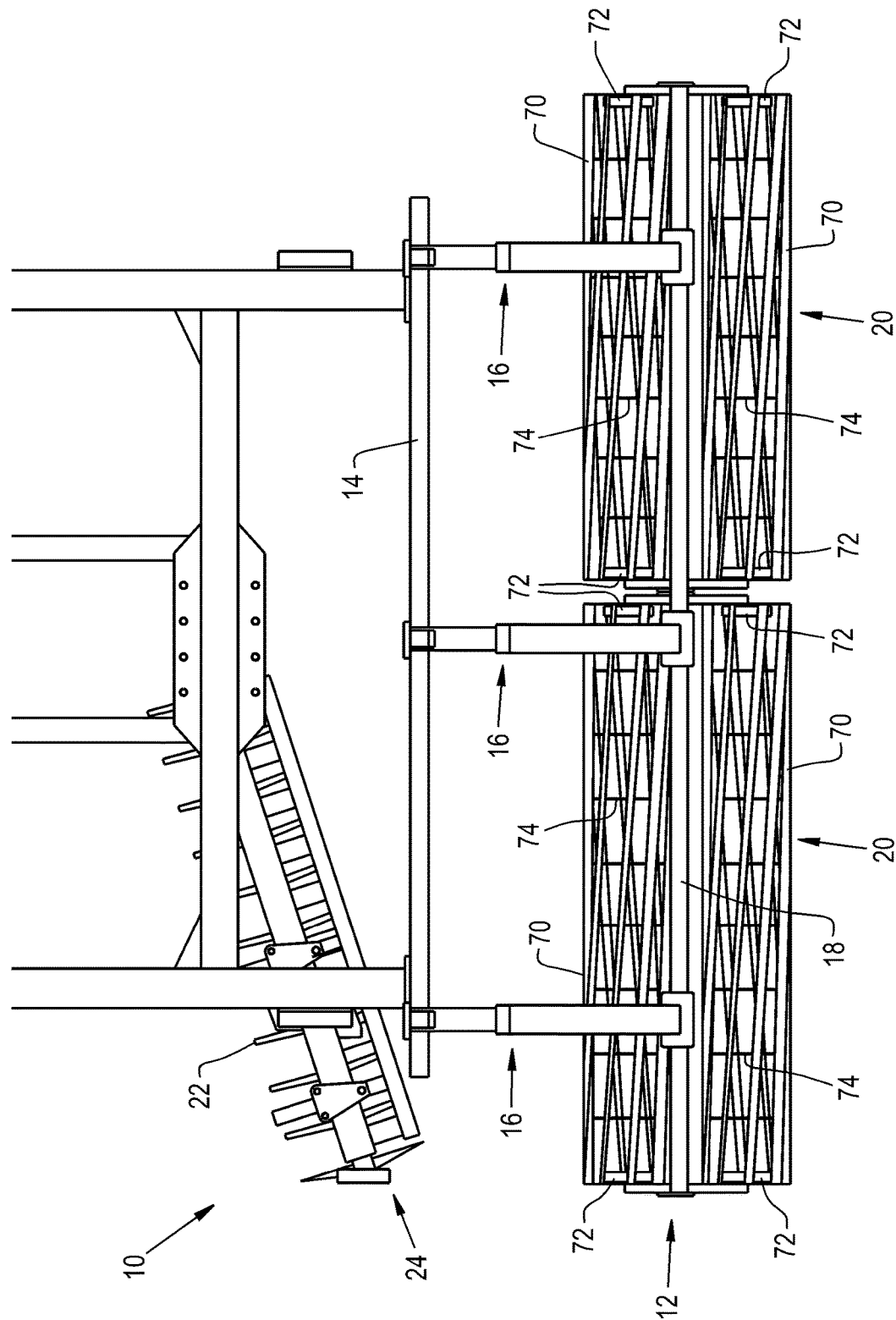
FIG. 1 is a perspective view of an agricultural tillage implement have a double rolling basket attachment connected thereto by a linkage assembly as disclosed herein.

Referring now to the drawings more specifically and to FIG. 1 in particular, there is shown an embodiment of a tillage implement 10. Tillage implement 10 includes a double rolling basket attachment 12 connected to a frame member 14 of implement 10. Frame member 14 is part of tillage implement 10 that is towed by a traction unit, such as by an agricultural tractor (not shown). Double rolling basket attachment 12 is connected to frame member 14 by a plurality of linkage assemblies 16, the linkage assemblies 16 extending from frame member 14 to a secondary frame member 18 that is part of double rolling basket attachment 12

Double rolling basket attachment 12 includes one or more double rolling basket assembly 20 which collectively may be thought of as an auxiliary implement for finishing the soil. The auxiliary implement also may include a spring tooth drag (not shown) with the double rolling basket assemblies 12, which act to finish the soil. In the exemplary embodiment shown, two double rolling basket assemblies 20 are shown positioned in side-by-side relationship across the width of tillage implement 10. It should be understood that for wider implements, three or more double rolling basket assemblies 20 may be used. For a small, narrow implement, one double rolling basket assembly 20 can be used.

In the illustrated embodiment, implement 10 is a disc ripper 10, having a plurality of concave, rotating discs 22 held in a disc row 24. Only a single disc row 24 is shown in the drawings for simplicity and clarity in illustration; however, it should be understood that in common applications and uses a plurality of disc rows 24 may be provided side-by-side in line with one another or angularly to one another. Implement 10 also can include additional disc rows 24 in front of the single disc row 24 that is illustrated, the additional disc rows being either in line with one another or angularly disposed with respect to one another, often at the opposite angle to the first described disc row or rows 24. Disc rippers of the type described are well known to those skilled in the art and will not be described further herein. However, it should be understood also that a double rolling basket attachment 12 as described herein can be used together with implements other than a disc ripper, such as, for example and not limitation, a chisel plow or cultivator.

Figure 2:
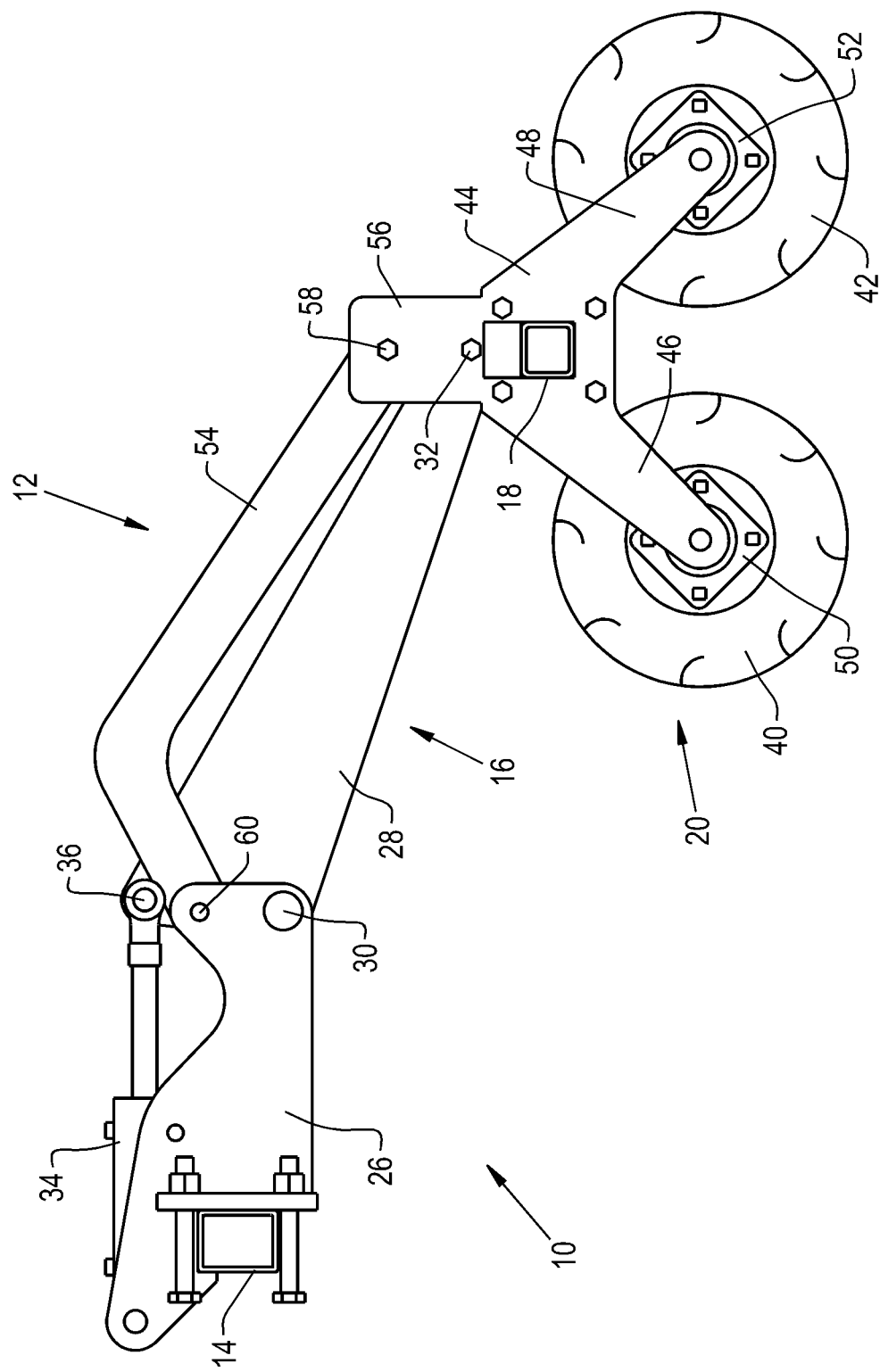
FIG. 2 is a side elevational view of the agricultural tillage implement and double rolling basket attachment shown in FIG. 1, better showing the linkage assembly used therefor.

With reference now more particularly to FIG. 2, each linkage assembly 16 includes a bracket 26 connected in fixed position to frame member 14 of implement 10. A positioning arm 28 provides a lower link connection of frame member 14 to secondary frame member 18. Positioning arm 28 is pivotally connected to bracket 26 at lower confronting regions thereof forming a pivotal connection 30 at a lower position relative to frame member 14. In the exemplary embodiment shown, positioning arm 28 is angled downwardly, and a distal end pivotal connection 32 connects the distal end of positioning arm 28 to secondary frame member 18 at a lower position relative to secondary frame member 18.

Each linkage assembly 16 further includes a force applicator 34, such as a hydraulic actuator, a spring or the like. Force applicator 34 is connected at an upper pivotal connection 36 formed with positioning arm 28. Positioning arm 28 has a widened end at the end interfacing with bracket 26, so that upper pivotal connections 36 between force applicator 34 and positioning arm 28 is generally above lower pivotal connection 30 between positioning arm 28 and bracket 26. The widened end between the area of pivotal connection 30 and pivotal connection 36 constitutes a lever for the length of positioning arm 28 between connection 30 and pivotal connection 32. Accordingly, actuation of force applicator 34 causes positioning arm 28 to rotate about lower pivotal connection 30, thereby causing the distal end of positioning arm 28 at the distal end pivotal connection 32 to move upwardly or downwardly, and thereby moving secondary frame member 18 upwardly or downwardly as well.

Each double rolling basket assembly 20 includes a forward basket 40 and a rearward basket 42 disposed in a fore and aft relationship, substantially aligned with one another. End hangers 44 are provided at each end of each basket pair including a forward basket 40 and a rearward basket 42. Hangers 44 are connected to secondary frame member 18 and have downwardly angled legs 46, 48 that are connected to bearings 50, 52 of baskets 40, 42 respectively. Accordingly, forward basket 40 is rotatably connected to a first leg 46 and rearward basket 42 is rotatably connected to a second leg 48.

From the structure described, actuation of force applicator 34 causes rotation of positioning arm 28 about pivotal connections 30 and results in raising or lowering the distal end of positioning arm 28 at the distal end pivotal connection 32 and thereby result in raising or lowering double rolling basket assembly 20. To control the orientation of the assembly of baskets 40, 42 together with hangers 44, an angular orientation arm 54 is provided. An upwardly projecting bracket 56 is connected to secondary frame member 18 and forms a pivotal connection 58 with orientation arm 54. At the opposite end of orientation arm 54 from its pivotal connection 58 to bracket 56, orientation arm 54 forms a pivotal connection 60 at an upper position in bracket 26. Pivotal connection 60 is generally above pivotal connections 30, and pivotal connection 58 is generally above pivotal connection 32. Positioning arm 28 therefore forms a lower link between bracket 26 and secondary frame 18, and orientation arm 54 forms an upper link between bracket 26 and bracket 56. The distance between pivotal connections 58 and 60 for orientation arm 54 is the same as the distance between pivotal connections 30 and 32 for positioning arm 28, and the positions of the pivotal connections relative to one another are such that a parallel relationship is established between the arms 28 and 54 between the pivotal connections thereof. That is, the distance between pivotal connections 30 and 60 in bracket 26 is the same as the distance between pivotal connections 32 and 58 in bracket 56. A parallelogram is established between the four pivotal connection points.

In the exemplary embodiment shown, forward basket 40 and rearward basket 42 are similarly constructed, each including a plurality of bars 70 extending between end plates 72 at each end of bars 70. Intermediate positioning or spacer rings 74 are provided to support bars 70 between end plates 72. Bars 70 may have various shapes, and can be arranged in a straight, longitudinal fashion or in a spiral arrangement. Bars 70 can be of different types to present more edge surfaces when soil conditions require more clod breaking or smoother surfaces when less clod breaking is required and seed bed firming is desired. Further, while the exemplary embodiment has forward baskets 40 and rearward baskets 42 of similar designs, it should be understood that the forward basket 40 can be of a design and have bars of one type, such as for cold breaking and rearward basket 42 can be of a different design and have bars of another type, such as to promote seed bed firming.

If placed in contact with the ground, baskets 40, 42 roll as tillage implement 10 is advanced across a field. As bars 70 encounter clods of dirt or other irregularities on the ground, bars 70 act to break up the clods and irregularities, and/or to firm the ground. By raising or lowering double rolling basket assembly 20 through the actuation of force applicator 34, the force applied against the bars 70 can be controlled. For example, when soil conditions are such that large and/or dense clods are present. It may be desirable to apply greater downward force on the baskets than when fewer, smaller or more easily broken clods are present.

The parallel relationship between positioning arm 28 and orientation arm 54 established by the pivotal connections 30,32 and 58, 60 at opposite ends of the arms remains parallel as the baskets are raised or lowered, even as the angular orientations of arms 28 and 54 relative to brackets 26 and 56 change. Accordingly, the angular orientation of baskets 40, 42 relative to the ground surface remains consistent throughout the adjustable and operating range of double rolling basket attachment 12, even as implement 10 is operated on uneven ground and/or as the working depth of disks 22 is changed.

Figure 3:
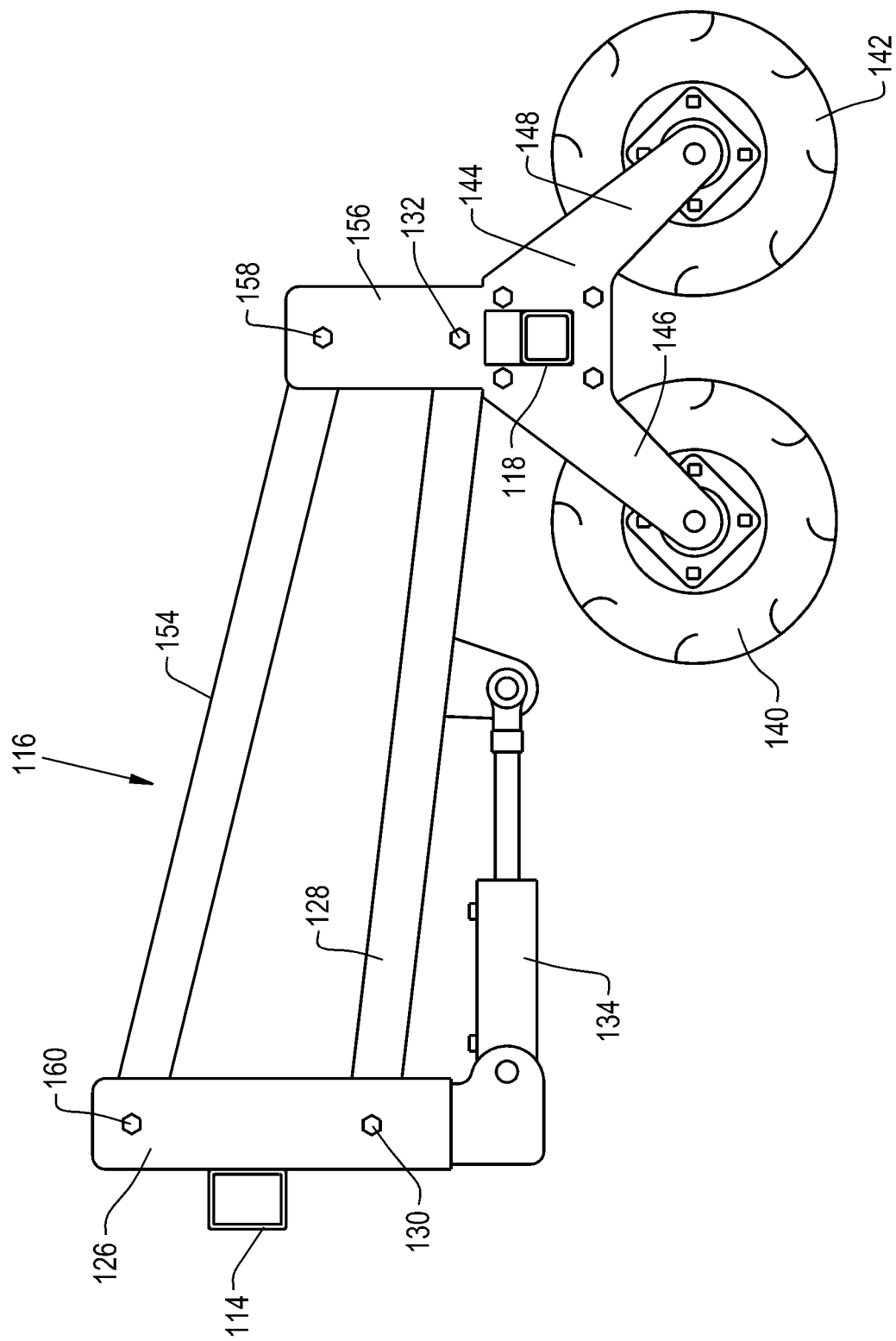
FIG. 3 is a side elevational view of another embodiment of a linkage assembly for a double rolling basket attachment.

Parallel two link connections between a first and second frame can be carried out in other ways. FIG. 3 illustrates another embodiment in which a frame member 114 is connected to a secondary frame member 118 by way of a linkage assembly 116. Frame member 114 is provided with a bracket 126, and secondary frame member 118 is provided with a bracket 156. An upper link 154 forms pivotal connections at an upper connection 160 with bracket 126 and an upper connection 158 with bracket 156. A lower link 128 forms a lower pivotal connection 130 with bracket 126 and a lower pivotal connection 132 with bracket 156. A hanger 144 is coupled with secondary frame member 118 and includes legs 146, 148 rotatably engaged with baskets 140, 142. A force applicator 134 is connected between the bottom of bracket 126 and a middle region of lower link 128. The length of upper link 154 between pivotal connections 158, 160 is parallel to the length of lower link 128 between pivotal connections 130, 132.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
    a frame member;
    a secondary frame member including an upper secondary pivotal connection and a lower secondary pivotal connection;
    a bracket connected to a portion of the frame member, the bracket extending away from the frame member, the bracket including an upper pivotal connection and a lower pivotal connection;
    a first arm extending between the bracket and the secondary frame member, the first arm pivotally connected at one end to the lower pivotal connection of the bracket and at an opposite end to the lower secondary pivotal connection of the secondary frame member, the first arm including an upper pivotal connection;
    a second arm extending between the bracket and the secondary frame member, the second arm pivotally connected at one end to the upper pivotal connection of the bracket and at an opposite end to the upper secondary pivotal connection of the secondary frame member;
    a force applicator positioned at least partially above the bracket, one end of the force applicator pivotally connected to the first arm at the upper pivotal connection thereof so that the first arm provides a lever;
    a side hanger coupled to the secondary frame member, the side hanger including first and second legs extending downwardly and outwardly relative to the secondary frame member;
    a first rolling basket connected to the first leg;
    a second rolling basket connected to the second leg; and
    wherein a portion of the second arm is positioned above the first arm.

2. The agricultural tillage implement of claim 1, wherein the force applicator is a hydraulic actuator.

3. The agricultural tillage implement of claim 1, wherein the lever projects upwardly from the first arm.

4. The agricultural tillage implement of claim 1, wherein the second arm forms an arch near the pivotal connection of the bracket and the second arm, and the arch extends above (a) the pivotal connection of the first arm and the bracket, (b) the pivotal connection of the bracket and the second arm, and (c) the pivotal connection of the force actuator and the first arm.

5. The agricultural tillage implement of claim 1, wherein the bracket and the force actuator are parallel relative to each other.

6. The agricultural tillage implement of claim 1, wherein the pivotal connection of the second arm and the bracket is lower than the upper pivotal connection of the force actuator and the first arm.

7. A double rolling basket attachment for an agricultural tillage implement having a frame member, the double rolling basket attachment comprising:
- a forward basket;
- a rearward basket directly behind the forward basket;
- a hanger having a forward leg forming a rotational coupling with the forward basket and a rearward leg forming a rotational coupling with the rearward basket;
- a secondary frame member coupled with the hanger; and
- a first arm extending between a bracket connected to the frame member and the secondary frame member, the first arm pivotally connected at one end to a lower pivotal connection of the bracket and at an opposite end to a lower secondary pivotal connection of the secondary frame member, the first arm including an upper pivotal connection;
- a second arm extending between the bracket and the secondary frame member, the second arm pivotally connected at one end to an upper pivotal connection of the bracket and at an opposite end to an upper secondary pivotal connection of the secondary frame member;
- a force applicator positioned at least partially above the bracket, one end of the force applicator pivotally connected to the first arm at the upper pivotal connection thereof so that the first arm provides a lever; and
- wherein a portion of the second arm is positioned above the first arm.

8. The double rolling basket attachment of claim 7, wherein the force applicator is a hydraulic actuator.

9. The double rolling basket attachment of claim 7, wherein the bracket is connected to and projects above the secondary frame member.

10. The double rolling basket attachment of claim 7, wherein the second arm forms an arch near the pivotal connection of the bracket and the second arm, and the arch extends above (a) the pivotal connection of the first arm and the bracket, (b) the pivotal connection of the bracket and the second arm, and (c) the pivotal connection of the force actuator and the first arm.

11. The double rolling basket attachment of claim 7, wherein the bracket and the force actuator are parallel relative to each other.

12. The double rolling basket attachment of claim 7, wherein the pivotal connection of the second arm and the bracket is lower than the upper pivotal connection of the force actuator and the first arm.

* * * * *